(12) United States Patent
Johnson

(10) Patent No.: US 8,469,068 B2
(45) Date of Patent: Jun. 25, 2013

(54) GOLF BAG PROTECTOR

(71) Applicant: Stanley Johnson, Fontana, CA (US)

(72) Inventor: Stanley Johnson, Fontana, CA (US)

(*) Notice: Subject to any disclaimer, the term of this patent is extended or adjusted under 35 U.S.C. 154(b) by 0 days.

(21) Appl. No.: 13/649,955

(22) Filed: Oct. 11, 2012

(65) Prior Publication Data
US 2013/0119076 A1 May 16, 2013

Related U.S. Application Data

(60) Provisional application No. 61/558,035, filed on Nov. 10, 2011.

(51) Int. Cl.
*A63B 55/00* (2006.01)

(52) U.S. Cl.
USPC ........................................ 150/159; 206/315.3

(58) Field of Classification Search
USPC ........................................ 150/159; 206/315.3
See application file for complete search history.

(56) References Cited

U.S. PATENT DOCUMENTS

| | | | |
|---|---|---|---|
| 1,500,991 A * | 7/1924 | Heitler ............................. 4/608 |
| 2,188,213 A * | 1/1940 | Wilson ............................. 135/95 |
| 2,507,249 A * | 5/1950 | Dorazio ...................... 206/315.8 |
| 2,718,251 A | 9/1955 | Barbato |
| 2,747,637 A | 5/1956 | Brown |
| 2,852,784 A * | 9/1958 | Winkler ............................ 4/599 |
| 2,985,212 A | 5/1961 | Dozier |
| 3,288,189 A | 11/1966 | Davis |
| 3,985,171 A * | 10/1976 | Summers et al. ............. 150/159 |
| 4,249,586 A * | 2/1981 | Setani ........................ 206/315.4 |
| 4,512,465 A | 4/1985 | Jobe |
| 4,953,768 A | 9/1990 | Muse |
| 4,968,048 A * | 11/1990 | Lortie ......................... 280/47.19 |
| D318,370 S * | 7/1991 | White ............................. D3/321 |
| 5,146,967 A | 9/1992 | Chapman |
| 5,220,950 A | 6/1993 | Cordasco |
| 5,383,505 A | 1/1995 | Cordasco, Jr. |
| 5,507,332 A | 4/1996 | McKinnon |
| 5,797,439 A | 8/1998 | Brandriet |
| 5,860,519 A | 1/1999 | Meyer et al. |
| 6,749,062 B1 * | 6/2004 | Meissner ................... 206/315.3 |
| 6,883,566 B2 | 4/2005 | Dirnberger et al. |
| 7,493,877 B2 * | 2/2009 | Broadway et al. ........... 122/19.2 |
| 7,780,002 B2 | 8/2010 | Manaster et al. |
| 7,869,365 B2 * | 1/2011 | Mannal et al. ................. 370/236 |
| 2003/0230503 A1 * | 12/2003 | Borrelli ....................... 206/315.3 |
| 2007/0138040 A1 * | 6/2007 | Chan .......................... 206/315.3 |

* cited by examiner

*Primary Examiner* — Tri Mai
(74) *Attorney, Agent, or Firm* — Patent Analysis Research Tech. Systems LLC; George L. Walton

(57) ABSTRACT

This invention provides a one-piece golf bag wrap protector for protecting golf bags from damage when placed on golf carts. The protector includes a pair of ends, a plurality of spaced securing holes disposed proximate an upper surface thereon, a plurality of fastening means having one end secured within the spaced securing holes, and another end being cooperatively secured to an upper peripheral edge of a golf bag. Attachment means disposed proximate the pair of ends for securing the protector wrapped around the golf bag. A plurality of female fasteners near one of the ends and a male fastener positioned near the other end at their upper portions for engaging one another to accommodate golf bags of different sizes.

A bungee cord associated with the spaced securing holes and golf hand cart handles for securing golf bags on golf hand carts to prevent movement there between.

20 Claims, 4 Drawing Sheets

GOLF BAG PROTECTOR

CROSS REFERENCE TO RELATED APPLICATION(S)

This instant application claims priority to provisional patent application Ser. No. 61/558,035, filed on Nov. 10, 2011.

BACKGROUND OF THE INVENTION

1. Field of the Invention

The present invention relates in general to golf accessories and more particularly to a one-piece wrap protective cover accommodating golf bags of different sizes, while simultaneously protecting the golf bags from damage when placed on golf carts.

2. Description of the Related Art

In recent years, the sport of golf has become increasingly popular. This popularity has produced over 27 million people playing or participating in the sport of golf within the U.S. and over 50 million people playing or participating in the sport of golf through out the World.

With this number of people playing or participating in the sport of golf results in an unbelievable number of golf bags are severely damaged or maned when the golf bags are placed or thrown onto golf carts for carrying them around the course. Also, the golf bags can pick up a considerable amount of dirt and debris when carried on golf carts during wet or after rainy weather. This result in the golf bags becoming soiled and the carrying of the dirt and debris into an automobile trunk, or a back seat where it can also be deposited on the upholstery and carpeting when placed in the interior of an automobile.

There have been many different types of golf bag covers created in the past for covering golf bags to be carried on golf carts especially during inclement weather and travel cases for protecting the golf bags from damage during handling or transportation as disclosed in the following prior patents:

| U.S. Pat. No. | Publication Date | Name of Inventor |
| --- | --- | --- |
| 2,718,251 A | Sep. 20, 1955 | Luca Barbato |
| 2,747,637 A | May 29, 1956 | Mary V. Brown |
| 2,985,212 A | May 23, 1961 | Robert H. Dozier |
| 3,288,189 A | Nov. 29, 1966 | Elmer H. Davis |
| 4,512,465 A | Apr. 23, 1985 | Howard L. Jobe |
| 4,953,768 A | Sep. 04, 1990 | Clarence W. Muse |
| 5,146,967 A | Sep. 15, 1992 | James W. Chapman |
| 5,220,950 A | Jun. 22, 1993 | Louis M. Cordasco |
| 5,383,505 A | Jan. 24, 1995 | Louis M. Cordasco, Jr. |
| 5,507,332 A | Apr. 16, 1996 | Michael D. McKinnon |
| 5,797,439 A | Aug. 25, 1998 | David S. Brandriet |
| 5,860,519 A | Jan. 19, 1999 | Steve D. Meyer et al |
| 6,683,566 B2 | Apr. 26, 2005 | Adolf Dirnberger et al |
| 7,780,002 B2 | Aug. 24, 2010 | Jacob S. Manaster et al |

The Barbato patent teaches a dirt and moisture cover for golf bags when being used as well as being stored. In addition, this patent teaches a golf bag cover that may be readily applied to golf bags of different sizes.

The Brown patent teaches a wrap covering device for forming a package with hand golf carts. This wrap covering device is wrapped about hand golf carts while carrying a golf bag to help protect the golf bag from dirt, mud, inclement weather and damage when going around a golf course and when carrying the hand golf cart to and from home.

Note that the patent to Dozier teaches a transparent and water-proof cover for golf bags for protecting the golf bag and the golf clubs disposed therein against rain and moisture. The transparent and water-proof cover is collapsible so that is easily folded and stored in a pocket of the golf bag.

The patent to Davis teaches a one-piece weather-proof protective cover to completely encase a golf bag and its clubs therein with an overlapping closure retained by a carrying strap of the golf bag.

Jobe teaches a protective golf bag insert and zipper cover or travel bag to further protect golf clubs from harmful externally applied longitudinal and lateral compression forces which might be encountered during baggage handling, transportation and/or storage.

Muse teaches a transparent and water-repellent rain cover that can be utilized with a golf bag stand or cart.

Note that the patent to Chapman teaches a transparent and water-repellent golf bag rain cover that is positioned over golf bags that are secured on a golf cart or vehicle in manner such that golf clubs and golf accessories can be accessed while covered on the golf cart or vehicle.

The patents to Codasco and Cordasco, Jr., relate to a transparent and water-repellent golf bag cover that protects the entire golf bag as well as the golf clubs stored therein. These patents teach that the cover fits snugly and securely on to the golf bag and conveniently used while golfing, protects the entire golf bag, as well as, the golf clubs and other golf accessories disposed therein and allows for easy access to the golf clubs and the other golf accessories.

McKinnon teaches another type of rain cover for a golf bag that comprises a belt adapted for attachment around the golf bag opening for receiving golf clubs, a pocket attached to the belt, a hood for covering the golf club and a skirt for encasing the golf bag. The pocket provides compartments for storing the hood and the skirt therein.

The patent to Brandriet relates to a foldable wrap type cover with a main portion that encloses a golf bag with a flap portion integral thereto for being folded over the top of golf clubs with a portion thereon secured to the main portion for completely enclosing and protecting the golf bag and the golf clubs from the elements.

Meyer et al teach a sports equipment carrier that can be utilized as a golf carrier or bag with an attachable outer covering that prevent the outer portion of the carrier from being scratched or marred. This patent further teaches a single unit of removably attached pouches of different sizes to the sport carrier for storing golf accessories or equipment therein.

Dirnberger et al teach a rain protection arrangement with a cover that is placed around a golf bag with zipper-like or hook and loop type fasteners at two longitudinal edges for closing the cover about a golf bag.

Finally, the patent to Manaster et al relates to a golf club travel bag for containing and transporting golf clubs within a golf bag along with other golf accessories. Also, Manaster et al teaches one or more interchangeable outer body members removably attached to the golf club travel bag to protect against inclement weather and travel and/or transportation.

Note that none of the above mentioned prior patents teaches the claimed specific one-piece wrap protective cover with a plurality of adjustable snaps and securing fasteners being disposed about an upper peripheral portion of the protective cover for easily securing the cover about a golf bag to protect against any damage thereto when placed or disposed on golf cart or vehicle. In addition, none of the afore-mentioned patents teaches a plurality of adjustable fasteners disposed at the upper peripheral portion for allowing the one-piece wrap protective cover to overlap for accommodating golf bags of different sizes.

SUMMARY OF THE INVENTION

A principle object of the present invention is to provide a unique and universal one-piece golf bag wrap protector to protect any golf bag from damage, such as tearing, marring and/or scratching when placed and/or secured on golf carts or vehicles. The one-piece golf bag wrap protector becomes extremely important to golf users who purchase or own very expensive or not so expensive golf bags, so that the esthetic, beauty and appearance of their golf bags can always be maintained.

The unique and universal one-piece golf bag wrap protector has a selected dimension that will allow complete enclosure and accommodation for golf bags of different sizes. This one-piece universal golf bag wrap protector includes a plurality of equally spaced grommet-like openings adjacent an upper peripheral portion of a golf bag for receiving a plurality of hook-like members therein. The plurality of hook-like members will engage and hook over a top portion of golf bags to secure the one-piece universal golf bag wrap protector about the golf bags to protect the outer portion of the golf bags from damage when placed and/or secured on golf carts or vehicles. Also, the one-piece universal golf bag wrap protector further includes a plurality of adjustment snaps positioned on a front surface thereof. The front surface adjustment snap fasteners are positioned at a selected distance from an elongated outer edge of the one-piece universal golf bag wrap protector and positioned above and equally spaced in between at least the first two spaced grommet openings that are the closet to the elongated outer edge. A single mating adjustment snap fastener is disposed on a back side surface on an opposite side of the one-piece universal protector golf bag wrap protector at a selected distance from the opposite outer elongated edge for engagement with the front surface adjustment snap fasteners for selective accommodations to different size golf bags. The elongated edges extend substantially the entire length thereof. Note that the adjustment snap fasteners on the front surface and the back side surface can be selected to be either a male or female snap fastener, if desired. The fastening of the single snap fastener to a selected front surface fastener will secure and wrap the one-piece universal wrap protector about golf bags with a majority of the one-piece universal wrap protector being open for a user to gain access to golf accessories within compartments of a golf bag, if desired.

In accordance with one aspect of the present invention, the one-piece universal wrap protector includes a male hook and loop type fastener, such as a VELCRO strip, selectively positioned adjacent one of the elongated edges of the one-piece universal wrap and a mating female hook and loop type fastener is selectively positioned adjacent the other elongated edge of the one-piece universal wrap protector for closing the one-piece universal wrap protector when it has been hooked or secured to the upper peripheral portion of a golf bag.

In accordance to another aspect of the present invention, the one-piece universal wrap protector includes at least an access pocket member with an opening for permitting a user to place or gain access to various types of necessary golf accessories and/or other items within the access pocket member when the one-piece universal wrap is secured about golf bags. The at least an access pocket member and opening are selectively sized and positioned in the one-piece universal wrap with details to be discussed later.

In accordance with still another aspect of the present invention, the one-piece universal wrap protector can be constructed from different types of materials, such as, a plastic or other synthetic material or even a natural and/or synthetic rubber, such as neoprene, latex mold rubber, other polymer materials, such as nylon (polyamides), polyurethane, polyethylene, vinyl to name just a few. The preferred material is a natural and or synthetic rubber that is lightweight, durable, flexible, and have water-moisture resistant capabilities. The rear or back side of the one-piece universal wrap is layered with a softer type material that is stitched, glued or removably fastened thereto. It can be removably fastened thereto by snaps, zippers, or hoop and loop type fasteners, such as VELCRO, to name just a few. To one of ordinary skill in the art, many other type of fastening means could be utilized, if desired. Note that the layer of softer material can be constructed from various types of material, such as cotton, polyethylene-cotton, polyolefin-cotton, fabrics, such as, bamboo, Dacron, rayon, polyester, laminated fabrics, layered or blended fabrics, crepe, jute, and combinations thereof, to name just a few. Many other types of materials not mentioned here can be utilized, if desired.

The softer material is utilized to preserve and protect the golf bags from any damage, tearing, scratching or marring, since the rear or back side will be laying or pressing against the golf bags. However, a cotton material and/or blended fabric materials are preferred. The selection of materials chosen for the one-piece universal wrap protector is based on cost, efficiency and effective results.

In accordance to a further aspect of the present invention, the hook-like members that secure the unique one-piece wrap onto a golf bag can be constructed from a durable and semi-rigid or rigid-like plastic or synthetic or natural rubber type material. These hook-like members are well known to be used for various practical purposes and utilities.

Additional aspects, objectives, features and advantages of the present invention will become better understood with regard to the following description and the appended claims of the preferred embodiments with reference to the accompanying drawings.

BRIEF DESCRIPTION OF THE DRAWINGS

The present invention may be better understood, along with its numerous objects, features, and advantages made apparent to those skilled in the art by referencing the accompanying drawings.

DETAILED DESCRIPTION

Figures 1, 2:
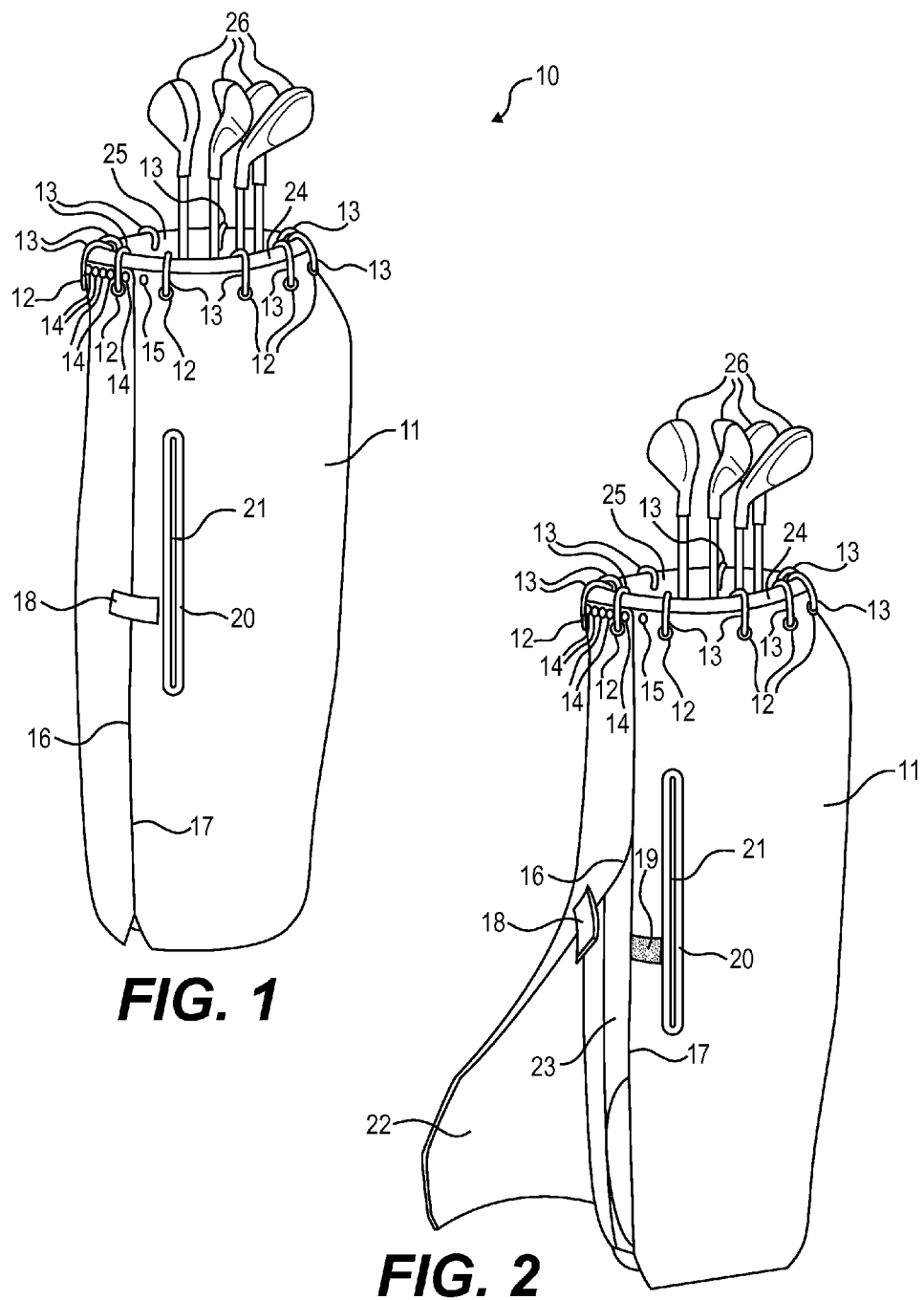
FIG. 1 illustrates a perspective view of a unique one-piece wrap protector that is completely wrapped around and secured to a golf bag carrying golf clubs according to the present invention.
FIG. 2 illustrates a perspective view of the unique one-piece wrap protector being wrapped around and secured to a golf bag carrying golf clubs with a portion of the one-piece universal wrap lying open to show a back side of the unique one-piece wrap protector with a layer of softer material attached thereto according to the present invention.

With reference now to the drawing, and more particularly to FIGS. 1 and 2 thereof, there is shown the present invention of a unique and universal one-piece golf bag wrap protector, denoted generally as 10, to protect any golf bag, denoted generally as 23, from damage, such as tearing, marring and/or scratching when placed and/or secured on golf carts or vehicles. This invention becomes extremely important to golf users who purchase or own very expensive or not so expensive golf bags, so that the esthetic, beauty and appearance of their golf bags can always be maintained. Note that this one-piece wrap protector 10 will also be able to accommodate golf bags of different sizes, while simultaneously protecting the golf bags from damage when placed on golf carts or vehicles.

FIG. 1 illustrates a perspective view of the unique and universal one-piece wrap protector 10 that is completely wrapped around and secured to golf bag 23. FIG. 2 illustrates a perspective view of the one-piece wrap protector 10 being wrapped around and secured to golf bag 23 with a portion of the one-piece wrap protector 10 lying partially open to show a back side of the unique one-piece universal wrap protector with a layer of softer material 22 attached thereto.

As shown in FIGS. 1 and 2, the one-piece wrap protector 10 is wrapped around and secured to golf bag 23. However, when the one-piece universal wrap protector 10 is laid out it has a preferred dimension of 49 inches in length and 36 inches in width (from the top to the bottom). Note that the dimensions could vary, if desired.

As seen in FIGS. 1 and 2, the one-piece wrap protector 10 generally comprises a body 11, with an outside surface thereof, a plurality of spaced grommet securing holes 12 at an upper peripheral specified location thereon, a plurality of hook-like members 13, a plurality of female snap fasteners 14 positioned at an upper peripheral portion near the elongated edge 16, a male fastener 15 at an upper peripheral portion near the elongated edge 17, a male hook and loop type fastener, such as VELCRO, is positioned at an intermediate location near the elongated edge 16, a female hook and loop type fastener 19, such as VELCRO, is positioned at an intermediate location near the elongated edge 17, and an access pocket member 20 with an opening 21 positioned at a specified location inward of the elongated edge 17 and the female hook and loop type fastener 19, as shown in FIG. 2.

The access pocket member 20 is of a selected dimension for holding golf accessories and other types of necessary items therein. Such selected dimension, preferably, has a width (vertical) of 7 inches and a length (horizontal) of 15 inches. This pocket 20 and opening 21 are selectively located on the front left side of the one-piece wrap protector 10 when it is laid out in a non-wrapped position and inward of elongated edge 17 and the female hook and loop fastener 19. Note that the access pocket member 20 can be of various selected dimensions, if desired. Note that the width of the opening 21 can be of various widths but preferably no more than 7 inches in width.

Optionally, a second access pocket member (not shown) for holding golf accessories and other types of necessary items therein may be positioned on a front right side of the one-piece wrap protector 10, when it is laid out in a non-wrapped position. This access pocket member is positioned at a specified location inward of the elongated edge 16 and the male hook and loop type fastener 18. The optional second access pocket member has a preferred dimension of 13 inches in length (horizontal) and 7 inches in width (vertical). Note that the width of the optional opening (not shown) can be of various lengths but preferably no more than 7 inches in width. However, the optional pocket members can be of various dimensions, if desired.

FIG. 1, clearly shows that the elongated edges 16 and 17 abut one another when the male and female hook and loop fasteners 18 and 19, respectively, are fastened together to close the one-piece wrap protector 10 that is wrapped around the golf bag 23. The corners at the top of the elongated edges 16 and 17 are preferably squared off, but can be rounded off or tapered, if desired. Also, the bottom corners of the edges 16 and 17 are preferably rounded off, but can either be tapered or squared off, if desired. Such corner shapes of the elongated edges 16 and 17 allows the one-piece wrap protector 10 to be wrapped about the golf bag 23 in a snug tapered or custom-like fit.

The access opening 21 of the access pocket member 20 is nearly closed, but is easily opened to gain access to necessary golf accessories and other items within the access pocket member 20. If desired, the opening could have various types of fastening means such as zipper means, hook and loop type fastening means, or snap means to name just a few to close the access opening 21.

As shown in FIGS. 1 and 2, the golf bag 23 has an upper peripheral edge 24 defining an opening 25 for receiving golf clubs 26 therein, which is shown and described in greater details in FIGS. 3 and 4 below.

FIG. 2 shows the one-piece wrap protector 10 being wrapped around and secured to a golf bag 23 carrying golf clubs 26 with a portion of the one-piece universal wrap protector 10 lying open to show a back side of the one-piece universal wrap protector 10 with a layer of softer material 22 attached thereto.

Figure 3:
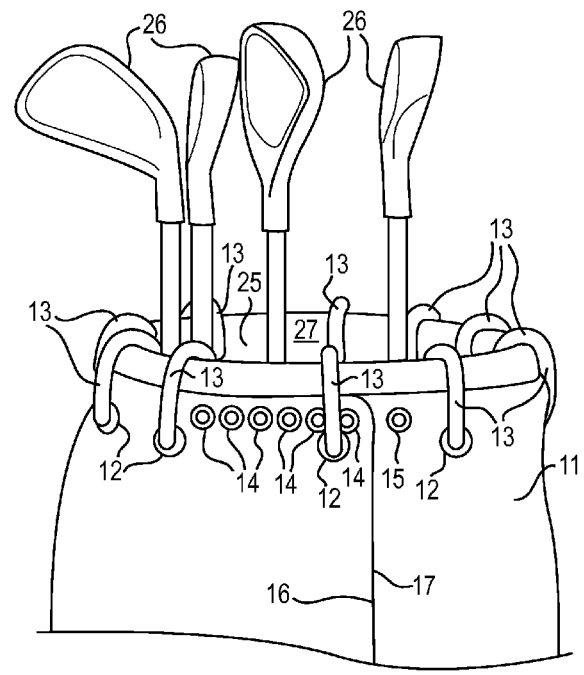
FIG. 3 illustrates a partial front view of the one-piece wrap protector being wrapped around and secured to a golf bag carrying golf clubs with an exploded section for showing the grommet openings, the male and female fasteners and the hook-like members according to the present invention.

FIG. 3 shows a partial front view of the one-piece wrap protector 10 being wrapped around and secured to a golf bag 23 carrying golf clubs 26 with an exploded section for showing the plurality of spaced grommet securing holes 12, the hook-like members 13, the male fastener 15 and the plurality of female fasteners 14. Also, FIG. 3 shows the golf bag 23 with the upper peripheral edge 24 defining the opening 25 for receiving golf clubs 26 therein. The opening 25 includes an upper interior wall surface 27. The plurality of hook-like members 13 have one end secured over the top peripheral edge 24 and the other end being secured within the plurality of spaced grommet securing holes 12 for securing and wrapping the one-piece wrap protector 10 around the golf bag 23 with ease and very little effort. Note that the male fastener 15 and the plurality of female fasteners 14 will allow a user to overlap the one-piece universal wrap protector 10 for accommodating golf bags of different sizes. This is achieved simply by selectively fastening the male fastener 15 to a selected one of the female fasteners 14.

Once this overlapping takes place the male hook and loop type fastener 18 and the female hook and loop type fastener 19 are not needed to close the one-piece wrap protector 10. Also, this overlapping places the elongated edge 17 over the elongated edge 16 and over a selected portion of the body 11 inward of elongated edge 16 for closing the one-piece unwrap protector 10 about the golf bag 23. The overlapped portion of the one-piece wrap protector 10 below the selected fastening of the male fastener 15 and the plurality of female fasteners 14 will allow a golf user to easily gain access to golf accessories and other necessary items within the golf bag 23, without ever removing the one-piece wrap protector 10 from around the golf bag 23 or removed from a golf cart or vehicle (see FIGS. 5 and 6).

Figure 4:
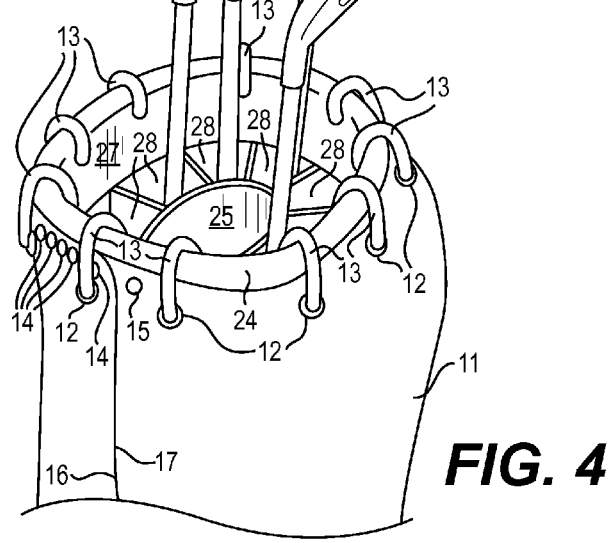
FIG. 4 illustrates a partial isometric view of the one-piece wrap protector being wrapped around and secured to a golf bag carrying golf clubs with an exploded section for showing the grommet openings, the male and female fasteners, the hook-like members and the top interior portion of a golf bag according to the present invention.

FIG. 4 illustrates a partial isometric view of the one-piece universal wrap protector 10 being wrapped around and secured to a golf bag 23 carrying golf clubs 26 with an exploded section for showing the plurality of spaced grommet holes 12, the male and female hook and loop type fasteners 18 and 19, the plurality of hook-like members and the top interior portion as defined by elements 24, 25 and 27-28 of the golf bag 23. Also, FIG. 4 illustrates golf club sectional dividers 28 for receiving and separating the clubs within the opening 25. Note that these golf club sectional dividers 28 are well known in the golf art and is not a necessary part of the present invention.

Figure 5:
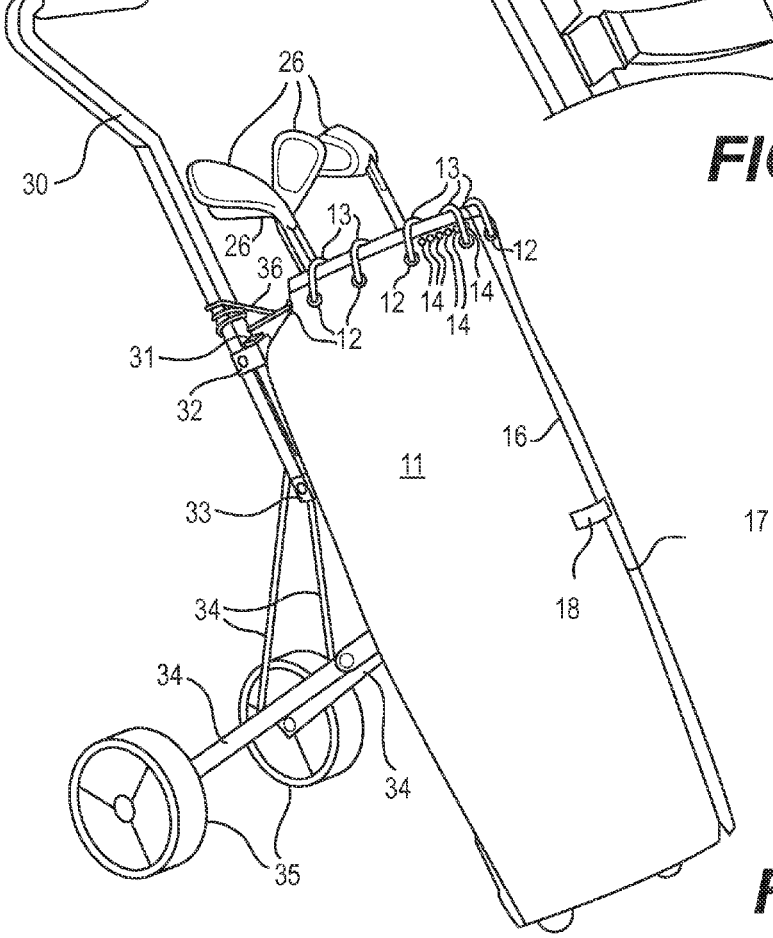
FIG. 5 illustrates a perspective side view of the one-piece wrap protector being wrapped around and secured to a golf bag carrying golf clubs that is utilized with a golf hand cart according to the present invention.

FIG. 5 illustrates a perspective side view of the one-piece wrap protector 10 being wrapped around and secured to the golf bag 23 carrying golf clubs 26 that is utilized with a golf hand cart device 29. This hand cart is conventional and well known in the art and will not be explained in great details. Elements 30-35 as shown in FIG. 5 are conventional components that make up the conventional golf hand cart device 29. For any details on the one-piece wrap protector 10 see the aforementioned discussions. The important feature shown in FIG. 5 is the securing bungee cord 36 (which is of a conventional type). A portion of the bungee cord 36 is wrapped around a handle stem portion 30 of the conventional golf hand cart device 29 with a pair of connector ends (not shown) being secured within on the plurality of spaced grommet holes 12 for tightly securing the one-piece wrap protector 10 and golf bag 23 combination on the golf hand cart device 29, while preventing any unnecessary movement while being transported on the golf hand cart device 29.

Figure 6:
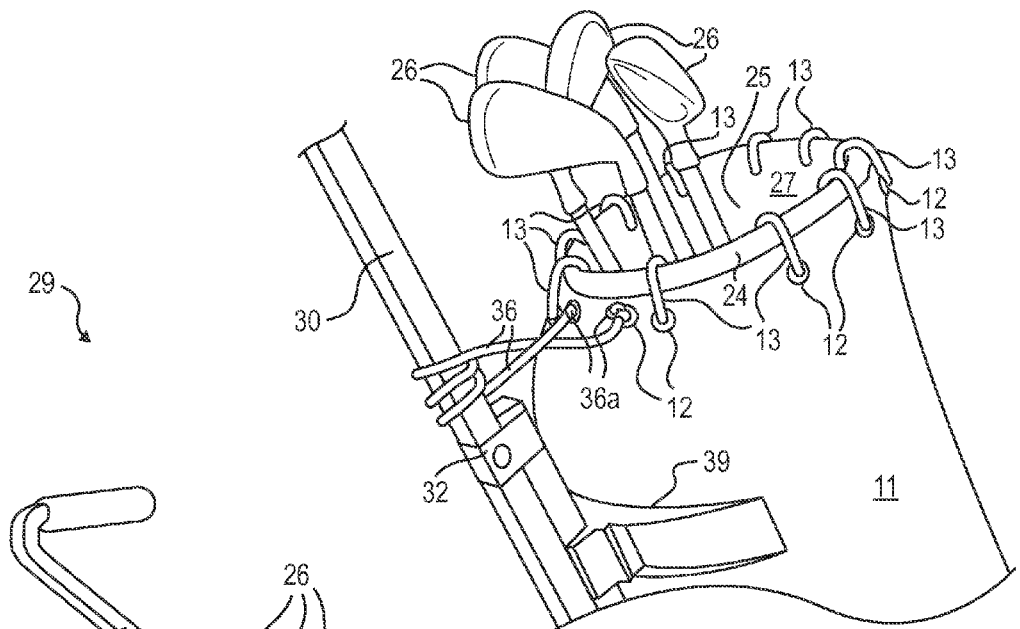
FIG. 6 illustrates a partial rear view of the one-piece wrap protector being wrapped around and secured to a golf bag carrying golf clubs that is utilized with a golf hand cart and a bungee cord for securing the one-piece wrap protector and golf bag combination to a golf hand cart according to the present invention.

FIG. 6 shows a partial rear view of the one-piece wrap protector 10 being wrapped around and secured to a golf bag 23 carrying golf clubs 26 that is utilized with a golf hand cart device 29 and a bungee cord 36 for securing the one-piece universal wrap protector 10 and golf bag 23 combination to the golf hand cart handle stem portion 30. This exploded partial view of FIG. 6 clearly demonstrates how the bungee cord 36 is wrapped around the golf hand cart handle stem portion 30 and how the connector ends are secured within selected ones of the plurality of grommet holes 12 for securing the one-piece wrap protector 10 and golf bag 23 combination to the golf hand cart device 29.

Figure 7:
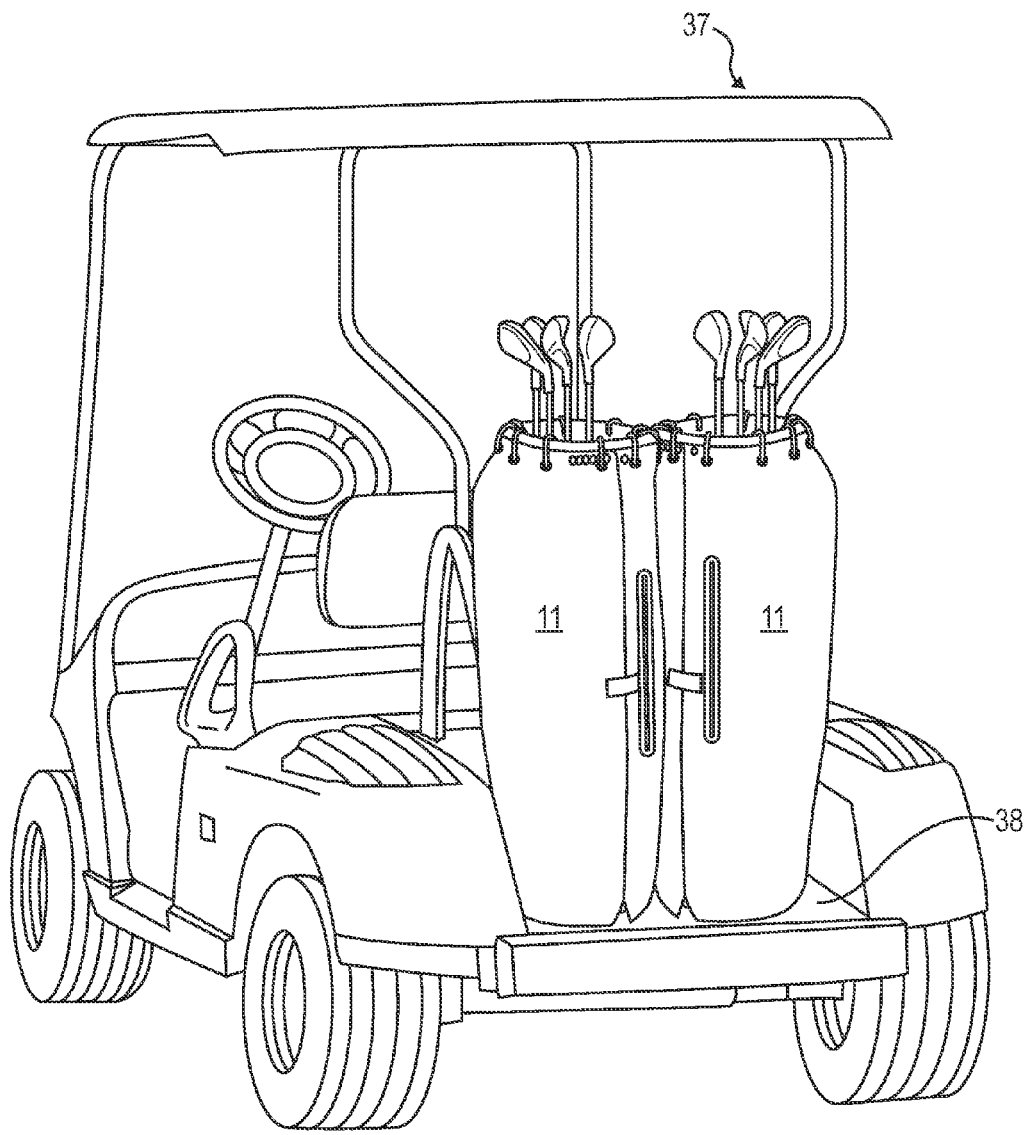
FIG. 7 illustrates a perspective view of the one-piece wrap protector being wrapped around and secured to golf bags carrying golf clubs that are mounted on a rear carrying area of a golf vehicle according to the present invention.

FIG. 7 shows a perspective view of a conventional golf vehicle 37 with a golf bag rear carrying area 38. In view of the present invention, the one-piece wrap protector 10 and the golf bag 23 combination are mounted on the rear carrying area 38 of a golf vehicle 37. The pair of one-piece wrap protector 10 and the golf bag 23 combinations that are mounted on the rear carrying area 38 of the golf vehicle 37 will achieve the necessary protection against any golf bag from damage, such as tearing, marring and/or scratching when a golf user places and/or secures the pair of one-piece wrap protector 10 and the golf bag 23 combinations on the golf vehicle 37.

In operation, a golf user can easily install and secure the one-piece wrap protector 10 about a standard size golf bag. First, the golf user will unfold the one-piece wrap protector 10 of the present invention and then wrap it around any golf bag and fasten the one-piece wrap protector 10 thereabout by fastening the male and female hook and loop fasteners 18 and 19, respectively, together. Next, the user can then attach one end of the hook-like elements 13 within the plurality of spaced grommet holes 12 and then hook or secure the other end over a top peripheral portion of a golf bag to completely secure the one-piece wrap protector 10 around the golf bag.

Note that a user could place one end of all of the hook-like members 13 within the plurality of grommet holes prior to wrapping the one-piece wrap protector 10 around a golf bag, if desired. Next, the golf user can hook or secure the other end over a top peripheral portion of the golf bag and then fasten the male and female hook and loop fasteners 18 and 19, respectively, together.

When golf bags of different sizes are being used, the same steps as discussed above for a standard size golf bag are repeated, except that the fastening of the male and female hook and loop fasteners 18 and 19 are not necessary. Instead, the one-piece wrap protector 10 with the elongated edge 17 is pulled over the elongated edge 16 until the male fastener 15 is moved to a selected one of the plurality of female fasteners 14, which will allow the user to overlap the one-piece wrap protector 10 to accommodate golf bags of different sizes and securely fastens the-piece wrap protector 10 thereabout. Now that the male fastener 15 is fastened to a selected one of the plurality of female fasteners 14, the overlapped portion of the one-piece wrap protector 10 below the selected fastening of the male fastener 15 and the plurality of female fasteners 14 allows the unfastened overlap portion to be easily separated to permit golf users to easily gain access to golf accessories within the golf bag 23 without ever removing the one-piece wrap protector 10 from around the golf bag 23 and from the golf cart or vehicle devices 29 and 37. Note that the golf users have the option of using either the access pocket member 20 to easily gain access to necessary golf accessories or necessary items therein or the unfastened overlap portion to easily gain access to necessary golf accessories and other items within the golf bag 23.

Preferably, the first female fastener 14 on the one-piece universal wrap protector 10 is positioned approximately ½ inch from the longitudinal edge 16 and the remaining female fasteners are then spaced approximately 1 inch apart from one another. However, the positioning of the female fasteners could vary, if desired. Also, it is preferred that the male fastener 15 be positioned approximately ½ inch from the longitudinal edge 17. Note that such positioning location of the male fastener 15 could vary, if desired. Optionally, a lower set of female fasteners 14 could be positioned in the same manner at a bottom peripheral portion of the one-piece wrap protector 10 as the upper female fasteners 14 and a male fastener 15 could be positioned in the same manner at a bottom peripheral portion of the one-piece wrap protector 10 as the upper male fastener 15 so that the one-piece wrap protector 10 can be completely closed at the bottom peripheral portion when it overlaps.

The one-piece wrap protector 10 can be constructed from different types of materials such as, a plastic or other synthetic material or even a natural and/or synthetic rubber, such as neoprene, latex mold rubber, other polymer materials, such as nylon (polyamides), polyurethane, polyethylene, vinyl to name just a few. The preferred material is a natural and or synthetic rubber that is lightweight, durable, flexible, and have water-moisture resistant capabilities and very easy to clean.

The rear or back side of the one-piece wrap 10 is layered with a softer type material 22 that is stitched, glued or removably fastened thereto. It can be removably fastened thereto by snaps, zippers, or hoop and loop type fasteners, such as VEL- CRO, to name just a few. To one of ordinary skill in the art, many other type of fastening means could be utilized, if desired. Note that the layer of softer material 22 can be constructed from various types of material, such as cotton, polyethylene-cotton, polyolefin-cotton, fabrics, such as, bamboo, Dacron, rayon, polyester, laminated fabrics, layered or blended fabrics, crepe, jute, and combinations thereof, to name just a few. Many other types of materials not mentioned here can be utilized, if desired.

The softer material 22 is utilized to preserve and protect the golf bags from any damage, tearing, scratching or marring, since the rear or back side will be laying or pressing against the golf bags. However, a cotton material and/or blended fabric materials are preferred. The selection of materials chosen for the one-piece universal wrap protector 10 is based on cost, efficiency and effective results.

Also, the hook-like members 13 that secure the one-piece universal wrap onto a golf bag can be constructed from a durable and semi-rigid or rigid-like plastic or synthetic or natural rubber type material. These hook-like members 13 are well known to be used for various other practical purposes and utilities.

Optionally, the male and female hook and loop fasteners 18 and 19 can take on various other types of fasteners selected from the group consisting of snaps, zippers, and magnetic fastening means to name just a few, but not limited to such. The zippers could optionally be placed at or along the longitudinal edges 16 and 17 in such a manner that they would never touch any golf bag, such as, golf bag 23 of the present invention. Also, the male and female hook and loop fasteners 18 and 19 may be secured to the one-piece wrap protector 10 by various methods, such as stitching, and gluing to name just a few. However, other securing methods could be utilized, if desired.

Also, the plurality of spaced grommet securing holes 12 and the plurality of hook-like members 13 can take on various other types of securing or fastening means that would be well known and obvious to one of ordinary skill in the art at the time the invention was made.

Having described the present invention as a unique one-piece golf bag wrap protector 10 that provides a very convenient and easy way for protecting golf bags from damage, such as tearing, scratching and marring when placed on golf carts and when placed or thrown into trunks or the inside of vehicles or cars. In addition, the unique one-piece golf bag wrap protector 10 is designed to protect golf bags from inclement weather such as rain and moisture, dust, mud or bird droppings and spills during use on golf carts, as well as protecting golf bags during storage and transportation.

Also, the golf bags can pick up a considerable amount of dirt, mud and debris when carried on golf carts during wet or after rainy weather. This result in the golf bags becoming soiled and the carrying of the mud, dirt and debris into an automobile trunk, or a back seat where it can also be deposited on the upholstery and carpeting when placed in the interior of an automobile. This is prevented by the easy cleaning and the wiping away of water, mud, dust, dirt, spills, bird droppings and debris from the one-piece golf bag wrap protector 10 before it is placed into an automobile trunk, or a back seat of an automobile or vehicle.

While the foregoing written description of the invention enables one of ordinary skill in the art to make and use what is considered presently to be the best mode thereof, those of ordinary skill will understand and appreciate the existence of variations, combinations, and equivalents of the specific embodiment, method, and examples herein. The invention should therefore not be limited by the above described embodiments, and examples, but by all embodiments and methods within the scope and spirit of the invention as claimed.

What is claimed is:

1. A universal golf bag protector in combination with a golf bag, the protector protects golf bags from damage when placed on golf carts, the golf bag protector comprising:
    a main body that includes opposite elongated parallel side edge portions that extends transverse to top and bottom portions thereof, the main body includes a front side and a back side;
    a plurality of spaced apart securing holes disposed at a location on the front side near a periphery of the top portion substantially along its entire length;
    a plurality of hook-like fasteners having a first end portion co-operably associated with the plurality of spaced apart grommet securing holes and the plurality of hook-like fasteners having a second end portion for fastening over a top portion of a standard size golf bag so that the main body can be wrapped around the golf bag to obviate any damage, such as, tearing, scratching and marring thereto when placed on golf carts; and
    a first fastening member positioned on the front side at an intermediate location near one of the elongated parallel side edge portions, and a second fastening member positioned on the front side at an intermediate location near the other one of the elongated parallel side edge portions, wherein the first and second fastening members are fastened together to close the main body after it has been wrapped around the golf bag, which causes the opposite elongated parallel side edge portions to come into abutting engagement with one another.

2. The universal golf bag protector according to claim 1, wherein the main body front side includes a plurality of adjustment female snap fasteners at a location near one of the parallel side edge portions and adjacent the top portion of the main body and a male snap fastener at location near the other one of the parallel side edge portions and adjacent the top portion of the main body.

3. The universal golf bag protector according to claim 2, wherein the male snap fastener is selectively positioned to engage one of the plurality of adjustment female snap fasteners to cause the main body parallel side edge portions to overlap one another, so that the main body will accommodate golf bags of varying sizes.

4. The universal golf bag protector according to claim 1, wherein the main body includes at least an access pocket member of a specified dimension selectively positioned on an exterior surface thereon for holding golf accessories and other necessary items therein.

5. The universal golf bag protector according to claim 1, wherein the first and second fastening members include hook and loop type material for selectively fastening the first and second fastening members together, to close the main body after it has been wrapped around the golf bag.

6. The universal golf bag protector according to claim 1, wherein a bungee cord is cooperatively associated with at least a pair of the spaced grommet holes and a golf hand cart handle for securing the golf bag with the protector wrapped thereabout on the golf bag hand cart.

7. The universal golf bag protector according to claim 6, wherein a portion of the bungee cord is selectively wrapped around the hand cart handle with each end of the bungee cord being received within the at least a pair of spaced grommet holes for tightly securing the golf bag with the protector wrapped thereabout on the golf bag hand cart, while preventing unnecessary movement there between.

8. The universal golf bag protector according to claim 1, wherein the golf bag protector can be constructed from a material of the group consisting of plastic or other synthetic material natural and/or synthetic rubber and other polymer type materials.

9. The universal golf bag protector according to claim 1, wherein the golf bag protector has a back side layered with a softer type material to protect the exterior surface of the golf bag.

10. The universal golf bag protector according to claim 9, wherein the softer type material is selected from the group consisting of cotton, polyethylene-cotton, polyolefin-cotton, fabrics, such as, bamboo, Dacron, rayon, polyester, laminated fabrics, layered or blended fabrics, crepe, jute, and other combinations of selected materials.

11. A golf bag comprising:
a custom-fitted golf bag wrap protector, the protector includes:
a one-piece body having a pair of ends;
a plurality of spaced securing holes disposed proximate an upper peripheral surface of the one-piece body;
a plurality of fastening means, the fastening means having one end secured within the plurality of spaced securing holes and another end being cooperatively secured to an upper peripheral edge of a golf bag for securing the one-piece wrap protector body around the golf bag; and
attachment means selectively disposed proximate the pair of ends for securing the pair of ends together after the one-piece wrap body has been completely wrapped around the golf bag and preventing any damage to the golf bag when placed on golf carts.

12. The golf bag according to claim 11, wherein the plurality of fastening means is defined as an S-shaped hook-like member.

13. The golf bag according to claim 12, wherein the S-shaped hook-like member having an upper portion defining the fastening means one end and a lower portion defining the fastening means another end, the S-shaped hook-like upper portion being hooked over the upper peripheral edge of the golf bag and the S-shaped hook-like lower portion being hooked within the plurality of spaced securing holes for securing the custom-fitted golf bag wrap protector about the golf bag with the pair of ends of the one-piece body engaging one another in a tight abutting engagement.

14. The golf bag according to claim 11, wherein the one-piece body includes a plurality of female snap fasteners at a location near one of the pair of ends and adjacent the top portion of the one-piece body and a male snap fastener at location near the other one of the pair of ends and adjacent the top portion of the one-piece body, the male snap fastener can be selectively positioned to engage one of the plurality of female snap fasteners to cause the pair of ends of the one-piece body to overlap one another so that the one-piece body can be adjusted to accommodate golf bags of different sizes.

15. The golf bag according to claim 11, wherein at least an access pocket member of a predetermined selected dimension is selectively positioned on an exterior front surface of the custom-fitted golf bag wrap protector for holding necessary golf accessories and other items.

16. The golf bag according to claim 15, wherein the at least an access pocket member has a preferred selected dimension that is at least 15 inches in length and 7 inches in width.

17. The golf bag according to claim 11, wherein the golf bag protector according to claim 1, wherein the golf bag protector can be constructed from a material of the group consisting of plastic or other synthetic material natural and/or synthetic rubber and other polymer type materials.

18. The golf bag according to claim 11, wherein the golf bag protector has a back side layered with a softer type material to protect the exterior surface of the golf bag, in which the softer type material is selected from the group consisting of cotton, polyethylene-cotton, polyolefin-cotton, fabrics, such as, bamboo, Dacron, rayon, polyester, laminated fabrics, layered or blended fabrics, crepe, jute, and other combinations of selected materials.

19. The golf bag according to claim 11, wherein a bungee cord is cooperatively associated with at least a pair of the spaced securing holes of the custom-fitted golf bag wrap protector and a golf hand cart handle for securing the custom-fitted golf bag with the wrap protector wrapped thereabout on a golf bag hand cart to hold against any unnecessary movement thereon.

20. A method of assembling a unique and universal golf bag wrap protector around a golf bag, comprising:
providing a one-piece body having a pair of ends;
providing a plurality of spaced securing holes disposed in and being proximate an upper peripheral surface of the one-piece wrap body;
providing a plurality of hook-like fastening means, the hook-like fastening means having one end hooked and secured within the plurality of spaced securing holes and another end being hooked and cooperatively secured over an upper peripheral edge of a golf bag for securing the one-piece wrap protector body around the golf bag; and
providing attachment means selectively disposed proximate the pair of ends for securing the pair of ends together in an abutting relationship with one another after the one-piece wrap body has been completely wrapped around the golf bag, thereby preventing any damage to the golf bag when placed on golf carts.

* * * * *